(12) United States Patent
Chintalapudi et al.

(10) Patent No.: US 9,686,760 B2
(45) Date of Patent: Jun. 20, 2017

(54) MULTIPLE INDEPENDENT NARROW CHANNELS IN WIRELESS NETWORKS

(71) Applicant: Microsoft Corporation, Redmond, WA (US)

(72) Inventors: Krishna Kant Chintalapudi, Bagalore (IN); Bozidar Radunovic, Cambridge (GB); Horia Vlad Balan, Los Angeles, CA (US); Michael Buettner, Seattle, WA (US); Vishnu Navda, Bangalore (IN); Ramachandran Ramjee, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 14/455,834

(22) Filed: Aug. 8, 2014

(65) Prior Publication Data

US 2014/0348155 A1    Nov. 27, 2014

Related U.S. Application Data

(62) Division of application No. 13/163,633, filed on Jun. 17, 2011, now Pat. No. 8,837,612.

(51) Int. Cl.
*H04K 1/10* (2006.01)
*H04W 56/00* (2009.01)
(Continued)

(52) U.S. Cl.
CPC .......... *H04W 56/0005* (2013.01); *H04B 1/00* (2013.01); *H04L 5/0007* (2013.01);
(Continued)

(58) Field of Classification Search
CPC .................................. H04B 1/00; H04L 45/24
See application file for complete search history.

(56) References Cited

U.S. PATENT DOCUMENTS 5,251,236 A    10/1993    Brehmer et al.
5,596,604 A    1/1997    Cioffi et al.
(Continued)

FOREIGN PATENT DOCUMENTS

JP    EP 2031783 A1 *    3/2009    ........... H03G 3/3078

OTHER PUBLICATIONS

Non-Final Office Action mailed Mar. 11, 2103 from U.S. Appl. No. 13/163,633, 17 pages.
(Continued)

*Primary Examiner* — Jaison Joseph
(74) *Attorney, Agent, or Firm* — Rainier Patents, P.S.

(57) ABSTRACT

A multiple independent narrow-channel wireless network and method for transmitting and received data over a wireless network using a fragmented frequency spectrum. The system and method uses a plurality of narrow wireless channels obtained from splitting a wide wireless channel. Each narrow channel performs sending, receiving, and carrier sensing. Moreover, each narrow channel is independent such that data can be sent or received without any interference from other narrow channels and without synchronization. Embodiments of the system and method include a compound radio having a compound receiver and a compound transmitter. The compound transmitter includes an inter-radiolet symbol synchronization module, to permit use of a single inverse fast Fourier transform block, and a dynamically configurable filter array, to mitigate leakage between channels. The compound receiver uses fraction data rate processing to optimize efficiency. A throughput maximal metric technique is used to determine its frequency of operation in white spaces.

20 Claims, 9 Drawing Sheets

(51) Int. Cl.
   H04B 1/00     (2006.01)
   H04L 5/00     (2006.01)
   H04L 27/00    (2006.01)
   H04L 27/26    (2006.01)
   H04L 12/707   (2013.01)
(52) U.S. Cl.
   CPC ........ *H04L 5/0041* (2013.01); *H04L 27/0006* (2013.01); *H04L 27/2655* (2013.01); *H04L 45/24* (2013.01)

(56) References Cited

U.S. PATENT DOCUMENTS

| | | | |
|---|---|---|---|
| 7,257,078 B2 | 8/2007 | Liu et al. | |
| 7,733,939 B2 | 6/2010 | Trachewsky | |
| 8,374,130 B2 | 2/2013 | Hassan et al. | |
| 8,837,612 B2 | 9/2014 | Chintalapudi et al. | |
| 9,019,811 B2* | 4/2015 | Lee .................... | H04L 27/2613 370/210 |
| 2004/0141566 A1* | 7/2004 | Kim .................... | H04B 7/0417 375/267 |
| 2005/0073973 A1* | 4/2005 | Laroia .................... | H04L 1/007 370/329 |
| 2005/0078759 A1* | 4/2005 | Zhang .................... | H04L 5/023 375/260 |
| 2005/0180314 A1 | 8/2005 | Webster et al. | |
| 2006/0114851 A1 | 6/2006 | Gupta et al. | |
| 2006/0215540 A1* | 9/2006 | Krishnamoorthi .. | H04L 27/2644 370/208 |
| 2007/0042733 A1 | 2/2007 | Tomioka | |
| 2007/0230635 A1* | 10/2007 | Wilhelmsson ....... | H03G 3/3052 375/345 |
| 2008/0049712 A1* | 2/2008 | Terabe .................. | H04L 1/0027 370/348 |
| 2008/0304405 A1* | 12/2008 | Lindoff ............... | H04L 27/2626 370/210 |
| 2009/0161782 A1* | 6/2009 | Kolze .................. | H04L 25/022 375/260 |
| 2009/0170442 A1* | 7/2009 | Asanuma .............. | H04L 1/0026 455/67.11 |
| 2009/0258603 A1 | 10/2009 | Ghaboosi | |
| 2009/0296925 A1 | 12/2009 | Kishiyama et al. | |
| 2010/0254281 A1 | 10/2010 | Kim et al. | |
| 2010/0301992 A1 | 12/2010 | Chandra et al. | |
| 2010/0322066 A1* | 12/2010 | Chun .................. | H04B 7/0452 370/210 |
| 2011/0021153 A1 | 1/2011 | Safavi | |
| 2011/0090885 A1 | 4/2011 | Safavi | |

OTHER PUBLICATIONS

Response filed Jul. 11, 2013 to the Non-Final Office Action mailed Mar. 11, 2103 from U.S. Appl. No. 13/163,633, 13 pages.
Notice of Non-Compliant Amendment mailed Oct. 15, 2013 from U.S. Appl. No. 13/163,633, 4 pages.
Response filed Nov. 20, 2013 to the Notice of Non-Compliant Amendment mailed Oct. 15, 2013 from U.S. Appl. No. 13/163,633, 7 pages.
Applicant-Initiated Interview Summary mailed Nov. 22, 2013 from U.S. Appl. No. 13/163,633, 3 pages.
Final Office Action mailed Feb. 11, 2014 from U.S. Appl. No. 13/163,633, 9 pages.
Response filed Apr. 28, 2014 to the Final Office Action mailed Feb. 11, 2014 from U.S. Appl. No. 13/163,633, 9 pages.
Notice of Allowance mailed May 12, 2014 from U.S. Appl. No. 13/163,633, 5 pages.
Cabric et al., "Spectrum Sharing Radios," IEEE Circuits and Systems Magazine, 2006, 16 pages.
Chung, Char-Dir, "Spectrally Precoded OFDM," IEEE Transactions on Communications, vol. 54, No. 12, Dec. 2006, 13 pages.
Papathanasiou, Christos and Leandros Tassiulas, "Joint Beamforming and Channel Selection for Multicast IEEE 802.11n WLANs," Apr. 2008, retrieved at <<http://ieeexplore.ieee.org/stamp/stamp.jsp?tp=&arnumber=4586085>>, 10 pages.
Steer, Michael, "Beyond 3G," IEEE Microwave Magazine, Feb. 2007, 7 pages.
Yang et al., "The Spaces Between Us: Setting and Maintaining Boundaries in Wireless Spectrum Access," MobiCom'10, Sep. 20-24, 2010, Chicago, IL, 12 pages.
"802.11n Bonding Unfairness," retrieved at <<http://www.zdnet.com/blog/ou/80211n-draft-110-a-kinder-gentlerneighbor/410>>, 17 pages.
Adya et al., "A Multi-Radio Unification Protocol for IEEE 802.11 Wireless Networks," BroadNets, 2003, 14 pages.
Akella et al., "Self-Management in Chaotic Wireless Deployments," MobiCom'05, Aug. 28-Sep. 2, 2005, Cologne, Germany, 15 pages.
Bahl et al., "White Space Networking with Wi-Fi like Connectivity," ACM SIGCOMM'09, Aug. 17-21, 2009, Barcelona, Spain, 12 pages.
Chandra et al., "A Case for Adapting Channel Width in Wireless Networks,"ACM SIGCOMM'08, Aug. 17-22, 2008, Seattle, WA, 12 pages.
Choi et al., "Achieving Single Channel, Full Duplex Wireless Communication," ACM MobiCom, 2010, 12 pages.
Garetto et al., "Modeling Per-Flow Throughput and Capturing Starvation in CSMA Multi-hop Wireless Networks," IEEE INFOCOM, 2006, 13 pages.
Gollakota, Shyamnath and Dina Katabi, "ZigZag Decoding: Combating Hidden Terminals in Wireless Networks," ACM SIGCOMM'08, Aug. 17-22, 2008, Seattle, WA 12 pages.
Heusse et al., "Idle Sense: An Optimal Access Method for High Throughput and Fairness in Rate Diverse Wireless LANs," ACM SIGCOMM'05, Aug. 21-26, 2005, Philadelphia, PA, 12 pages.
Horton, M.C. and R. J. Wenzel, "The Digital Elliptic Filter—A Compact Sharp-Cutoff Design for Wide Bandstop or Bandpass Requirements," IEEE Transactions on Microwave Theory and Techniques, vol. MTT-15, No. 5, May 1967, pp. 307-314, 8 pages.
Hou et al., "Understanding Cross-Band Interference in Unsynchronized Spectrum Access," ACM CoRoNet'09, Sep. 21, 2009, Beijing, China, 6 pages.
Jamieson, Kyle and Hari Balakrishnan, "PPR: Partial Packet Recovery for Wireless Networks," ACM SIGCOMM'07, Aug. 27-31, 2007, Kyoto, Japan, 12 pages.
Kakumanu, Sandeep and Raghupathy Sivakumar, "Glia: A Practical Solution for Effective High Datarate Wifi-Arrays," ACM MobiCom'09, Sep. 20-25, 2009, Beijing, China, 12 pages.
Katti et al., "XORs in the Air: Practical Wireless Network Coding," ACM SIGCOMM'06, Sep. 11-15, 2006, Pisa, Italy, 12 pages.
Kochut et al., "Sniffing out the correct Physical Layer Capture model in 802.11b," ICNP, 2004, 10 pages.
Mishra et al., "Distributed Channel Management in Uncoordinated Wireless Environments," ACM MobiCom'06, Sep. 23-26, 2006, Los Angeles, CA, 12 pages.
Moscibroda et al., "Load-Aware Spectrum Distribution in Wireless LANs," IEEE, 2008, pages.
Radunovic et al., "Rethinking Indoor Wireless Mesh Design: Low Power, Low Frequency, Full-duplex," IEEE, 2010, 6 pages.
Rahul et al., "Frequency-Aware Rate Adaptation and MAC Protocols," ACM MobiCom'09, Sep. 20-25, 2009, Beijing, China, 12 pages.
Rahul et al., "Learning to Share: Narrowband-Friendly Wideband Networks," ACM SIGCOMM'08, Aug. 17-22, 2008, Seattle, WA, 12 pages.
Rozner et al., "Traffic-Aware Channel Assignment in Enterprise Wireless LANs," IEEE, 2007, 11 pages.
Tan et al., "Fine-grained Channel Access in Wireless LAN," ACM SIGCOMM'10, Aug. 30-Sep. 3, 2010, New Delhi, India, 12 pages.
"TV Fool," retrieved at <<http://www.tvfool.com>> on Feb. 22, 2011, 3 pages.
Yang et al., "Supporting Demanding Wireless Applications with Frequency-agile Radios," USENIX NSDI, 2010, 15 pages.

* cited by examiner

MULTIPLE INDEPENDENT NARROW CHANNELS IN WIRELESS NETWORKS

CROSS-REFERENCE TO RELATED APPLICATIONS

This patent application is a divisional of, and claims priority from, U.S. patent application Ser. No. 13/163,633 filed on Jun. 17, 2011, which is incorporated herein by reference in its entirety.

BACKGROUND

Wi-Fi®, which is a registered trademark of the Wi-Fi Alliance®, is using ever wider bandwidths. Wi-Fi® started out with a bandwidth of 20 megahertz (MHz), moved to 40 MHz, and current standards are approaching 80 MHz. However, the Wi-Fi® bandwidth is in an "all or nothing" fashion. In other words, a Wi-Fi®-enabled device typically either uses the entire spectrum that is allocated to the device or uses none of it.

There are three main challenges with using ever-wider bandwidth as a contiguous Wi-Fi® channel. A first challenge is that the efficiency of the Wi-Fi® system goes down. Even though speeds may go up as the bandwidth increases, the actual end user throughput is actually significantly lower. The reason for this is that existing Wi-Fi® devices are mandated to reduce their channel width immediately upon detecting any coexisting Wi-Fi® device. Thus, Wi-Fi® devices are often not able to efficiently use their full bandwidth capabilities. Moreover, the Wi-Fi® device has to pause and listen for other devices before transmitting. This means that the pause time starts dominating.

A second challenge is that wide channels tend to create unfairness. This is because wide channels tend are more prone than narrow channels to overlap with neighboring networks. For example, neighboring houses can have overlapping networks. There can be unfairness between networks, such that some networks may get little or no throughput. Thus, when coexisting Wi-Fi® networks operate over different but overlapping Wi-Fi® channels, significant unfairness, including starvation, is possible.

A third challenge occurs when there is only a non-contiguous frequency spectrum available. In this situation, there may not be the full bandwidth available in the white space. White spaces are frequencies allocated to a broadcasting service but not used. By way of example, there may be 40 MHz of white space available but in the middle there may be 6 MHz blocked out (such as being used by a transmitting television station). In this case, current Wi-Fi® devices cannot use the 40 MHz spectrum efficiently or even operate there.

Some existing techniques do make use of narrow channels. However, these techniques lack independence. In particular, some techniques transmit on all channels simultaneously. Other techniques either transmit all at the same time or receive all at the same time. Still other techniques tie the channels together so that the channels are not independent. This tends to decrease the efficiency of the Wi-Fi® device.

Efficiency is decreased when one narrow channel is dependent upon another narrow channel. This is because using interdependent narrow channel techniques do not allow fairness between channels and do not allow interoperation when there are multiple access points. Thus, while these techniques make use of narrow channels, the interdependence between the channels can mitigate some of the benefits of using narrow channels.

Some existing techniques require the channels to be synchronized. One such technique uses fine-grained sub-channels that allow each node to use only a part of the frequency spectrum. However, the use of subchannels requires a synchronous system, meaning that all nodes transmit within a few microseconds of each other. This makes it difficult for this technique to coexist with unsynchronized neighboring networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the multiple independent narrow-channel wireless network and method facilitate transmission and reception of data over a wireless network that has a fragmented frequency spectrum. In particular, embodiments of the system and method split a wide wireless channel into a plurality of independent narrow channels. This provides the same bandwidth as the wide wireless channel but allows embodiments of the system and method to fill non-contiguous frequency bands. For example, if the wide channel bandwidth is 20 MHz, embodiments of the system and method can split this into twenty 1 MHz narrow channels that are operating independently of each other.

Embodiments of the system and method use independent channels. This means that for each of the narrow channels data can be sent or received without any interference from the other narrow channels. Moreover, no synchronization between channels is necessary. Embodiments of the system and method gain efficiency by allowing nodes to transmit on narrower channels, but since the narrow channels are independent of each other, the operation is asynchronous. This provides increased efficiency over traditional Wi-Fi®.

Embodiments of the system and method mitigate any inefficiency because when using a plurality of narrow channels the transmission time is much longer as compared to the pause time. Moreover, the unfairness issue is mitigated, because if any overlap were to occur it would only be a narrow channel overlapping instead of the entire bandwidth. In addition, any non-contiguous frequency bandwidths are fine because embodiments of the system and method merely transmit around any used frequency in the middle of the bandwidth.

Each narrow channel embodiments of the system and method performs at least three functions, namely carrier sensing, sending, and receiving. Carrier sensing is listening to determine whether anyone else is transmitting, and waiting if that is occurring. Embodiments of the system and method include a compound radio that includes a compound receiver and a compound transmitter. The compound radio that is built over existing orthogonal frequency division multiplexing (OFDM) single wide channel radios and enables independent transmissions and receptions over the multiple narrow channels.

The compound transmitter includes an inter-radiolet symbol synchronization module that synchronizes composite OFDM frame such that only a single inverse fast Fourier transform is needed. Moreover, the compound transmitter includes a dynamically configurable filter array that mitigates transmission spillage between the narrow channels. In particular, the dynamically configurable filter array ensures that each narrow channel can independently transmit without leakage into adjacent narrow channels.

The compound receiver includes a fractional data rate processing module so that each radiolet will be processed only its fraction of the total bandwidth. This serves to optimize the receiver processing. The fractional data rate processing module downscales the frequency of the received signal and then subsamples the signal to obtain digital signals at a fractional rate. Each of these signals then is processed using a fractional fast Fourier transform block to obtain a subsampled signal.

Embodiments of the system and method also include a throughput maximal metric technique that uses the metric to determine its frequency of operation in white spaces. A throughput maximal metric is defined that determines a frequency of operation of the compound receiver. Periodically, every node scans the spectrum of interest in a frequency range from a start frequency to an end frequency to determine a center frequency in this frequency range that maximizes the metric. If two or more regions of the frequency range have the same value for the metric, then the lower frequency is selected as the frequency of operation.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a multiple independent narrow-channel wireless system and method reference is made to the accompanying drawings, which form a part thereof, and in which is shown by way of illustration a specific example whereby embodiments of the multiple independent narrow-channel wireless network and method may be practiced. It is to be understood that other embodiments may be utilized and structural changes may be made without departing from the scope of the claimed subject matter.

I. System and Operational Overview

Embodiments of the multiple independent narrow-channel wireless system and method use multiple and independent narrow channels. By independent, it is meant that embodiments of the multiple independent narrow-channel wireless system and method are able to send on one narrow channel without affecting what is occurring on any of the adjacent narrow channels.

More specifically, independence means that on every single one of the narrow channels that embodiments of the multiple independent narrow-channel wireless system and method are able to perform carrier sensing and can send and receive signals completely independently of each other without any connection to other or adjacent narrow channels. There are three functions that each narrow channel needs to perform: carrier sensing, sending, and receiving. Carrier sensing is listening to determine whether anyone else is transmitting, and waiting if that is occurring.

Figure 1:
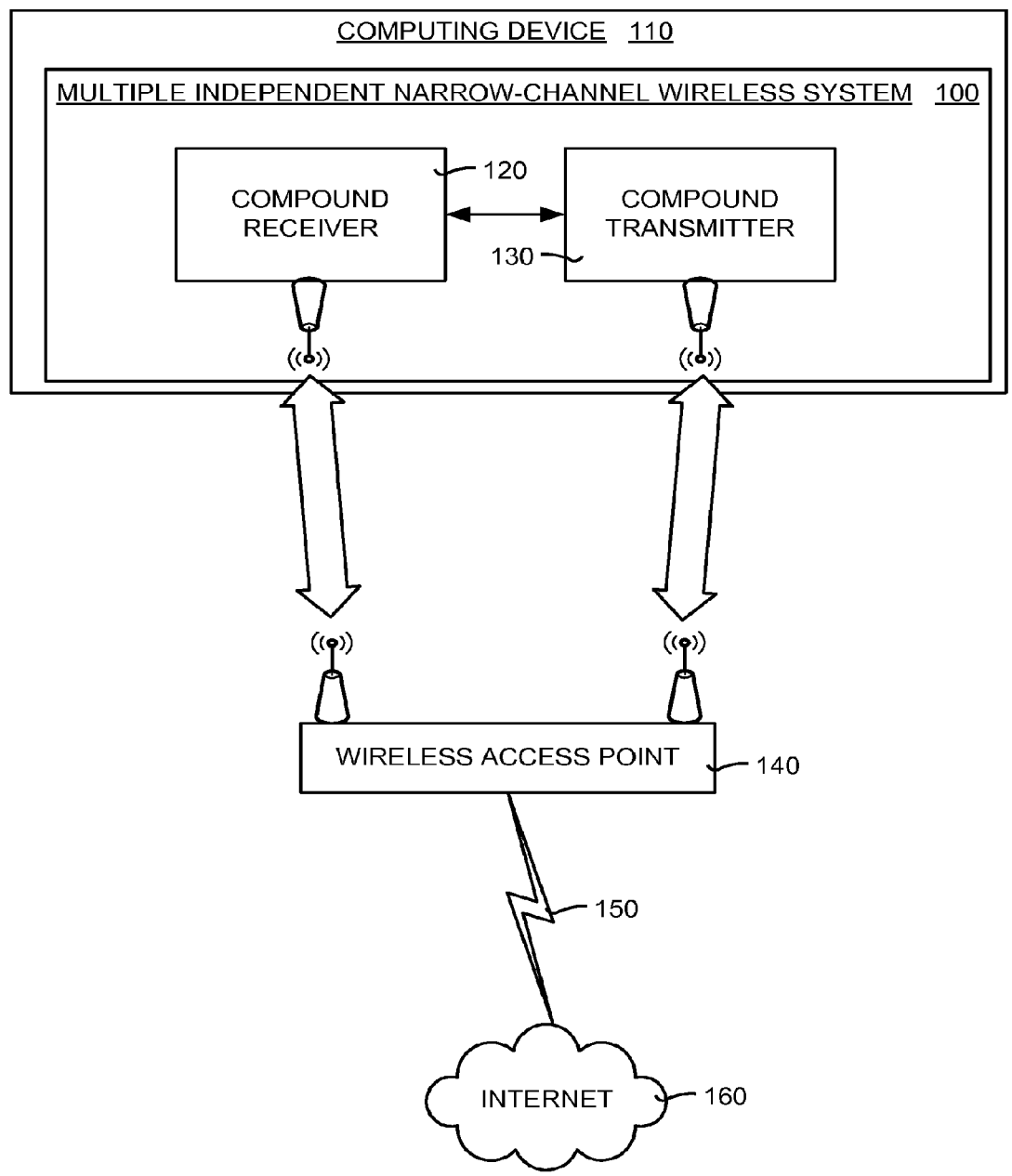
FIG. 1 is a block diagram illustrating a general overview of embodiments of the multiple independent narrow-channel wireless system and method implemented in a computing environment.

FIG. 1 is a block diagram illustrating a general overview of embodiments of the multiple independent narrow-channel wireless system 100 and method implemented in a computing environment. In particular, embodiments of the multiple independent narrow-channel wireless system 100 and method are implemented on a computing device 110. This computing device may be virtually any device that contains a processor, such as a desktop computer, notebook computer, and mobile phone.

Embodiments of the multiple independent narrow-channel wireless system 100 and method include a compound receiver 120 and a compound transmitter 130. Together, the compound receiver 120 and the compound transmitter 130 make up a compound radio. Embodiments of the multiple independent narrow-channel wireless system 100 and method include a compound radio that is built over existing Orthogonal Frequency Division Multiplexing (OFDM) single wide channel radios and enables independent transmissions and receptions over multiple narrow channels.

Orthogonal Frequency Division Multiplexing (OFDM) is widely recognized as an extremely efficient way of transmitting digital information. In addition, OFDM by design is inherently amenable to splitting wide channels into several narrow channels, since it transmits information over several narrow subbands. An OFDM transmitter splits the entire available radio bandwidth into several narrow overlapping subbands and transmits data bits by multiplexing them over these narrow subbands (also called subcarriers).

Embodiments of the multiple independent narrow-channel wireless system 100 and method transmit and receive signals to and from a wireless access point 140. Typically, this wireless access point 140 is in communication 150 with the Internet 160. This communication 150 may be wired or wireless. In addition, only one computing device 110 is shown in FIG. 1, but it should be noted that there may be multiple computing devices in communication with the wireless access point 140 at any given time.

While in general, transmissions over overlapping subbands would interfere with each other, embodiments of the multiple independent narrow-channel wireless system 100 and method carefully chose spacing between OFDM subbands and the time synchronization of the subband transmissions to ensure their orthogonality at the compound receiver 120 by the alignment of their spectral nulls. Embodiments of the multiple independent narrow-channel wireless system 100 and method use n radiolets created over OFDM by partitioning all the available subbands into n equal groups, where n is the number of narrow channels. Radiolet is 1/nth of the available subbands.

Embodiments of the multiple independent narrow-channel wireless system 100 and method use independent narrow channels that transmit and receive packets over these narrow channels at arbitrary times and from different devices. This introduces two key deviations from the standard OFDM radio. First, transmissions and receptions on different narrow channels will typically not be time or frequency synchronized since they may be from different devices. This lack of time and frequency synchronization deviates from the ideal OFDM behavior and translates to interference between adjacent narrow channels due to lack of orthogonality. How embodiments of the multiple independent narrow-channel wireless system 100 and method overcome this interference is discussed in detail below.

Second, there may be significant difference in the received powers across the narrow channels given that these receptions could be from different transmitters located at varying distances from the receiver. Embodiments of the multiple independent narrow-channel wireless system 100 and method can accommodate these deviations while enabling multiple independent narrow channels by making several key changes to the standard OFDM transmitter and receiver. These changes are discussed in detail below.

Figure 2:
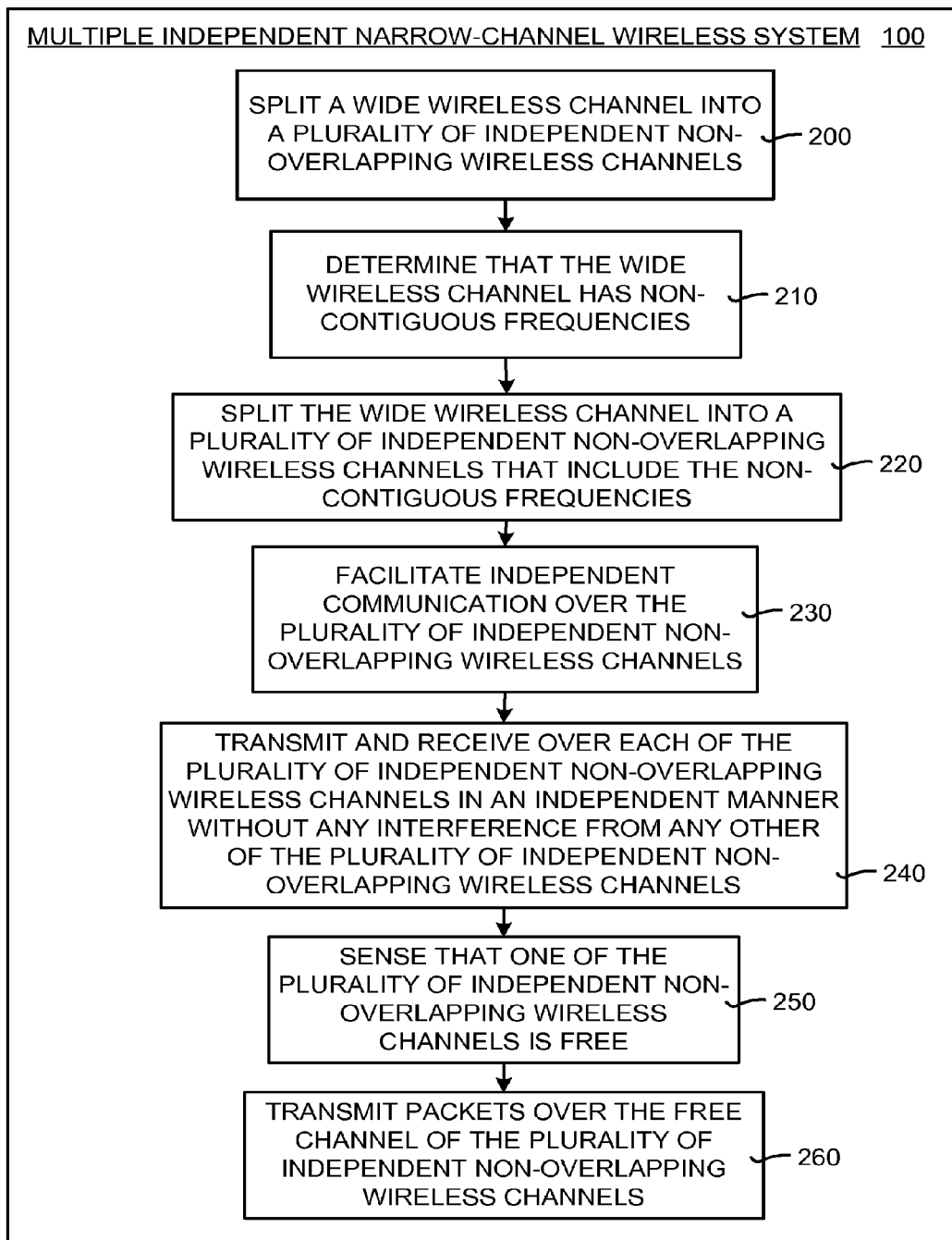
FIG. 2 is a flow diagram illustrating the general operation of embodiments of the multiple independent narrow-channel wireless system and method shown in FIG. 1.

FIG. 2 is a flow diagram illustrating the general operation of embodiments of the multiple independent narrow-channel wireless system 100 and method shown in FIG. 1. In general, embodiments of the multiple independent narrow-channel wireless system 100 and method split a wide wireless channel into multiple smaller channels and admit independent communication over those smaller channels.

Specifically, as shown in FIG. 2, the operation of embodiments of the multiple independent narrow-channel wireless method begins by splitting a wide wireless channel into a plurality of independent non-overlapping wireless channels (box 200). In some embodiments, the method determines that the wide wireless channel contains non-contiguous frequencies (box 210). This may occur when a transmission station is on a frequency that is within the frequencies of the wide wireless channel. Embodiments of the method then split the wide wireless channel into a plurality of independent non-overlapping wireless channels that include the non-contiguous frequencies (box 220).

Embodiments of the multiple independent narrow-channel wireless method then facilitate independent communication over the plurality of independent non-overlapping wireless channels (box 230). Next, embodiments of the method transmit and receive over each of the plurality of wireless channels in an independent manner without any interference from any other of the plurality 9 of wireless channels (box 240).

Embodiments of the multiple independent narrow-channel wireless method include a carrier sensing feature that senses when one of the plurality of independent non-overlapping wireless channels is free (box 250). When this occurs, embodiments of the multiple independent narrow-channel wireless method transmit packets over the free channel of the plurality of wireless channels (box 260).

II. System and Operational Details

The system and operational details of embodiments of the multiple independent narrow-channel wireless system 100 and method will now be discussed. This includes the operation of the compound transmitter 130 (including an inter-radiolet symbol synchronization (IRSS) module and a dynamically configurable filter array), and the compound receiver 120 (including a fractional data rate processing module.

II.A. Compound Transmitter

As shown in FIG. 1, embodiments of the multiple independent narrow-channel wireless system 100 and method include the compound transmitter 130. Before discussing the details of the compound transmitter 130, an overview of a typical orthogonal frequency division multiplexing (OFDM) transmitter will be given. An OFDM transmitter can be logically divided into two distinct parts: a digital baseband and an analog front end. These two parts will now be discussed.

The digital baseband is a digital circuit that converts bits to be transmitted into a digital baseband signal with a bandwidth of B MHz (or 20 MHz in case of WiFi®). An OFDM transmission starts by taking groups of bits and mapping them into symbols. A symbol typically specifies the phase θ and amplitude a of a sinusoid and is often represented by a complex number $ae^{j\theta}$. If the number of the sub-bands being used is N, then N symbols are grouped into an OFDM Symbol. The OFDM Symbols are then presented as input to a inverse fast Fourier transform (IFFT) block one at a time. The IFFT block takes as input an OFDM symbol and produces N samples of a complex digital baseband signal.

The analog front-end is an analog circuit that takes the digital baseband signal as input and converts it into a radio transmission at the carrier frequency (or 2.412 GHz for WiFi® channel 1). The complex baseband digital signal samples are then transformed into the continuous analog baseband signal S(t) using a digital to analog converter (DAC), up-converted to carrier frequency, and then passed through an analog filter to limit spectral leakage before transmission through the antenna.

A simple design for a compound transmitter would simply duplicate the standard OFDM transmitter n times for each radiolet, and then add up the signals from each radiolet before transmission. However, simple design will not work well because the transmissions over the narrow channels are not time synchronized. This leads to significant transmission spillage over adjacent channels.

Figure 3:
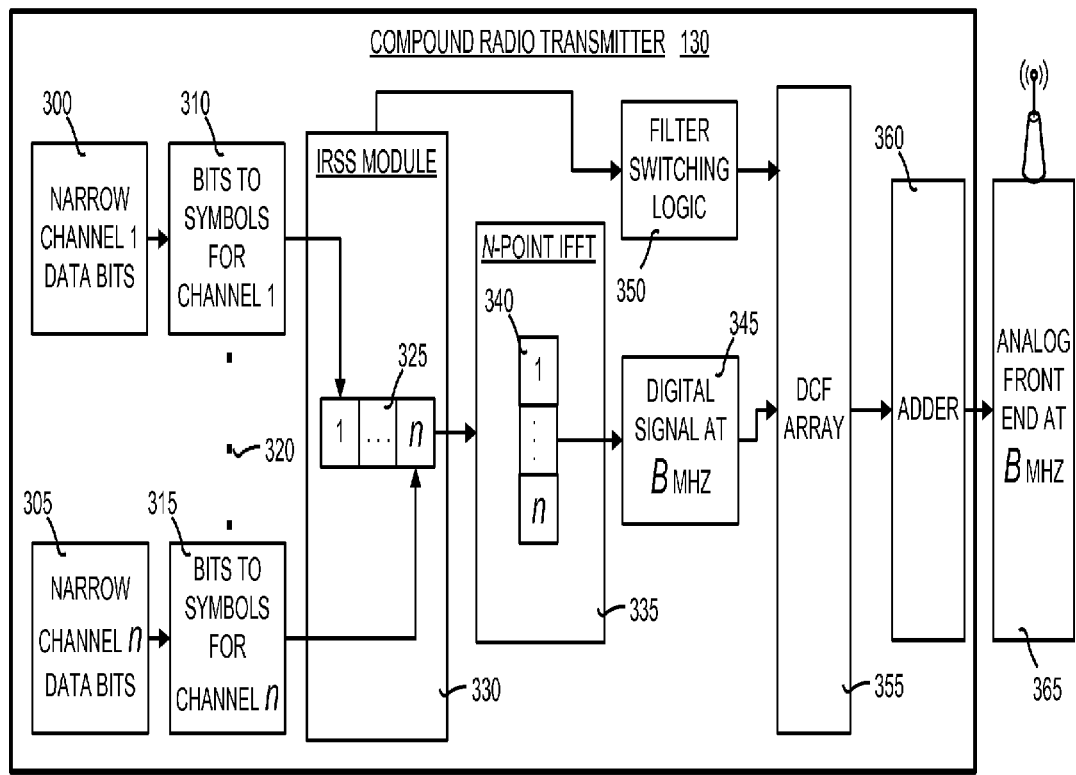
FIG. 3 is a block diagram illustrating the operational details of embodiments of the compound transmitter shown in FIG. 1.

This simple design can be improved by having a transmit-side filter array that filters the spillage before the signals of each of the radiolets are added up and transmitted. FIG. 3 is a block diagram illustrating the operational details of embodiments of the compound transmitter 130 shown in FIG. 1. The compound transmitter 130 takes digital data bits on each of the narrow channels and converts them to symbols.

As shown in FIG. 3, there are n number of narrow channels The data bits for narrow channel 1 300 all the way to the data bits for narrow channel n 305 are input. The data bits for narrow channel 1 300 are converted to symbols for channel 1 310. Similarly, the data bits for narrow channel n 305 are converted to symbols for narrow channel n 315. The ellipsis 320 is to show that this conversion is occurring for each of the narrow channels 1 to n. Each of the symbols from narrow channels 1 to n is used to generate a composite OFDM frame 325.

As explained in detail below, the compound transmitter 130 of embodiments of the multiple independent narrow-channel wireless system 100 and method uses an inter-radiolet symbol synchronization (IRSS) module 330 to synchronize the symbols from the various radiolets and create the composite OFDM frame 325.

The composite OFDM frame 325 then is consumed by an N-point IFFT 335. Each of the narrow channels 1 to n 340 is processed by the N-point IFFT 335. The output of the N-point IFFT 335 is a digital signal at B MHz 345. Moreover, output from the IRSS module 330 is sent to a filter switching logic 350.

The compound transmitter 130 uses a transmit-side filter array since transmissions from different devices will not be time synchronized, which can cause interference at the receiver. More specifically, the compound transmitter 130 uses a dynamically configurable filter (DCF) array 355 because filters have to be turned on only when transmission is on-going in the corresponding narrow channel. Moreover, the compound transmitter 130 uses a separate preamble for each narrow channel. Frequency scaling is used to convert preambles in one channel to another. Output from the filter switching logic 350 and the digital signal at B MHz 345 is input to the DCF array 355.

The output of the DCF array 355 is sent to an adder 360. Here, the adder 360 adds each of the narrow channels to form a single signal. The signal is sent to the analog front end 365 that is at B MHz. The analog front end transmits the signal at the frequency of B MHz 345.

The compound transmitter includes two additional components as compared to a typical OFDM transmitter. The first additional component is the IRSS module 330 that constructs a composite OFDM frame by performing symbol synchronization across the narrow channels. The second additional component is the DCF array 355 with the filter switching logic 350 that mitigates transmission spillage. Each of these components will now be described in more detail.

II.A.1. Inter-Radiolet Symbol Synchronization (IRSS) Module

If the bandwidth of the radio front end is B MHz, then the IFFT 340 consumes an OFDM symbol every N/B seconds. For example, if B is 20 MHz, and the number of sub-bands is 64, then each OFDM symbol duration is about 3.2 μsec. Since there cannot be any breaks in the transmission of a packet, a new OFDM symbol must be presented every 3.2 μsec. This symbol level synchronization comes naturally in an OFDM transmitter since all the symbols correspond to the same packet being transmitted.

In a compound radio, however, different sub-bands may correspond to different packets. Since different packets can start at arbitrary times, the arrival of these symbols from various radiolets will not be synchronized. The IRSS module 330 uses a clock running at the rate of N/B for synchronizing the symbols from each radiolet.

Figure 4:
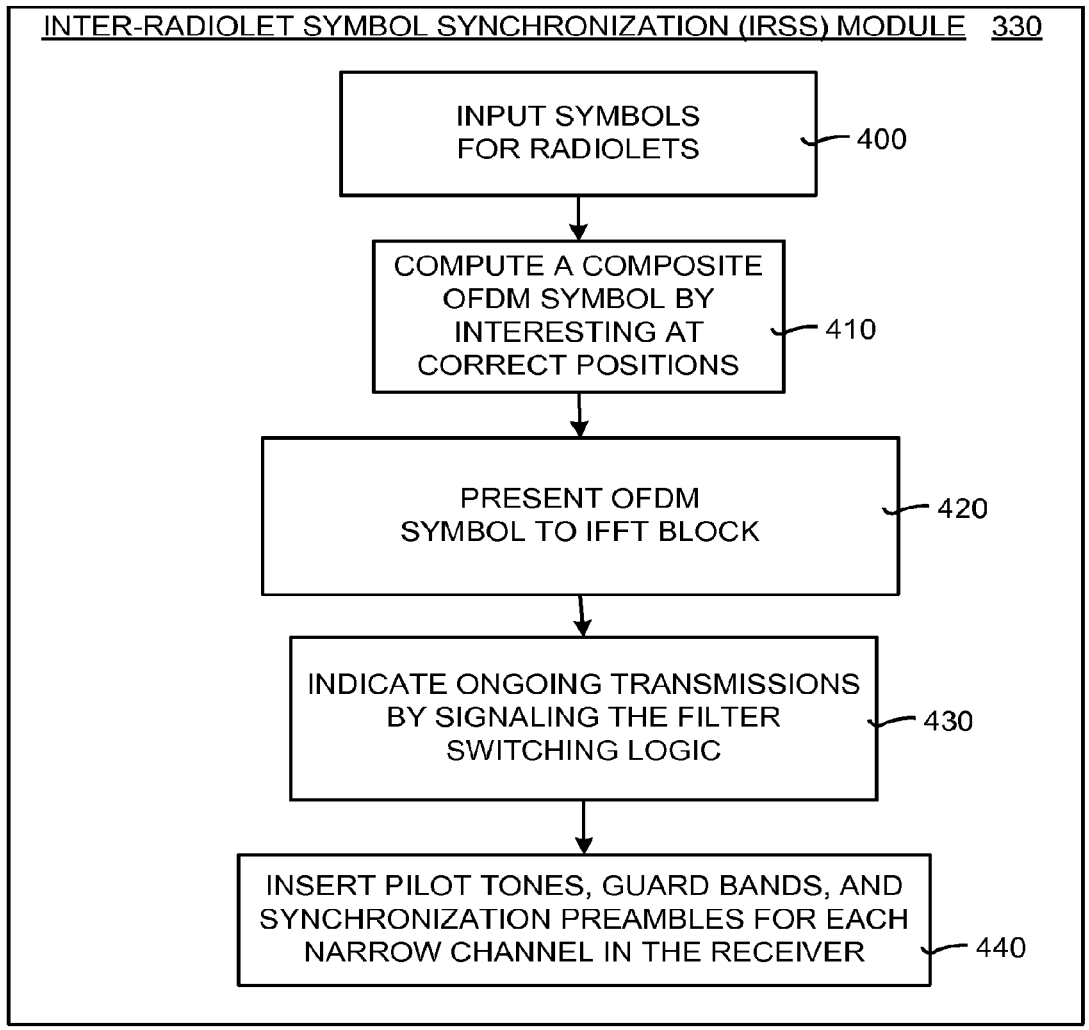
FIG. 4 is a flow diagram illustrating the operational details of embodiments of the IRSS module shown in FIG. 3.

As shown in FIG. 4, the IRSS module 330 performs three functions. FIG. 4 is a flow diagram illustrating the operational details of embodiments of the IRSS module 330 shown in FIG. 3. As shown in FIG. 3, the operation of the IRSS module 330 begins by first taking as input the symbols (or zeros in case of no transmission) from various radiolets (box 400). Next, the module 330 constructs a composite OFDM symbol by inserting them at correct positions (box 410). The module 330 then presents this symbol to the IFFT block at the correct time (box 420).

Second, the module 330 provides signaling to the filter switching logic 350 (described in detail below) indicating which transmissions are ongoing (box 430). Third, the module 330 inserts pilot tones, guard bands, and the synchronization preambles for each narrow channel of the receiver (box 440).

II.A.2. Dynamically Configurable Filter (DCF) Array

Existing systems ensure that all transmissions are synchronized in both time and frequency, and, thus do not suffer transmission spillage. However, given that embodiments of the multiple independent narrow-channel wireless system 100 and method are designed to coexist with independent networks, such time and frequency synchronization is infeasible. Thus, transmission spillage is unavoidable.

Transmission spillage cannot be circumvented by the use of employing filters at the receiver in embodiments of the multiple independent narrow-channel wireless system and method, since the channels are narrow and closely spaced. Guard bands have been shown to be an effective approach to mitigate the effects of transmission spillage. However, guard bands by themselves can be very inefficient.

Instead of directly mitigating the effects of transmission spillage, embodiments of the multiple independent narrow-channel wireless system 100 and method first reduce the transmission spillage by using an array of transmit-side digital filters. Then, embodiments of the multiple independent narrow-channel wireless system 100 and method use a small guard band to eliminate their effects on adjacent narrow channels.

Figure 5:
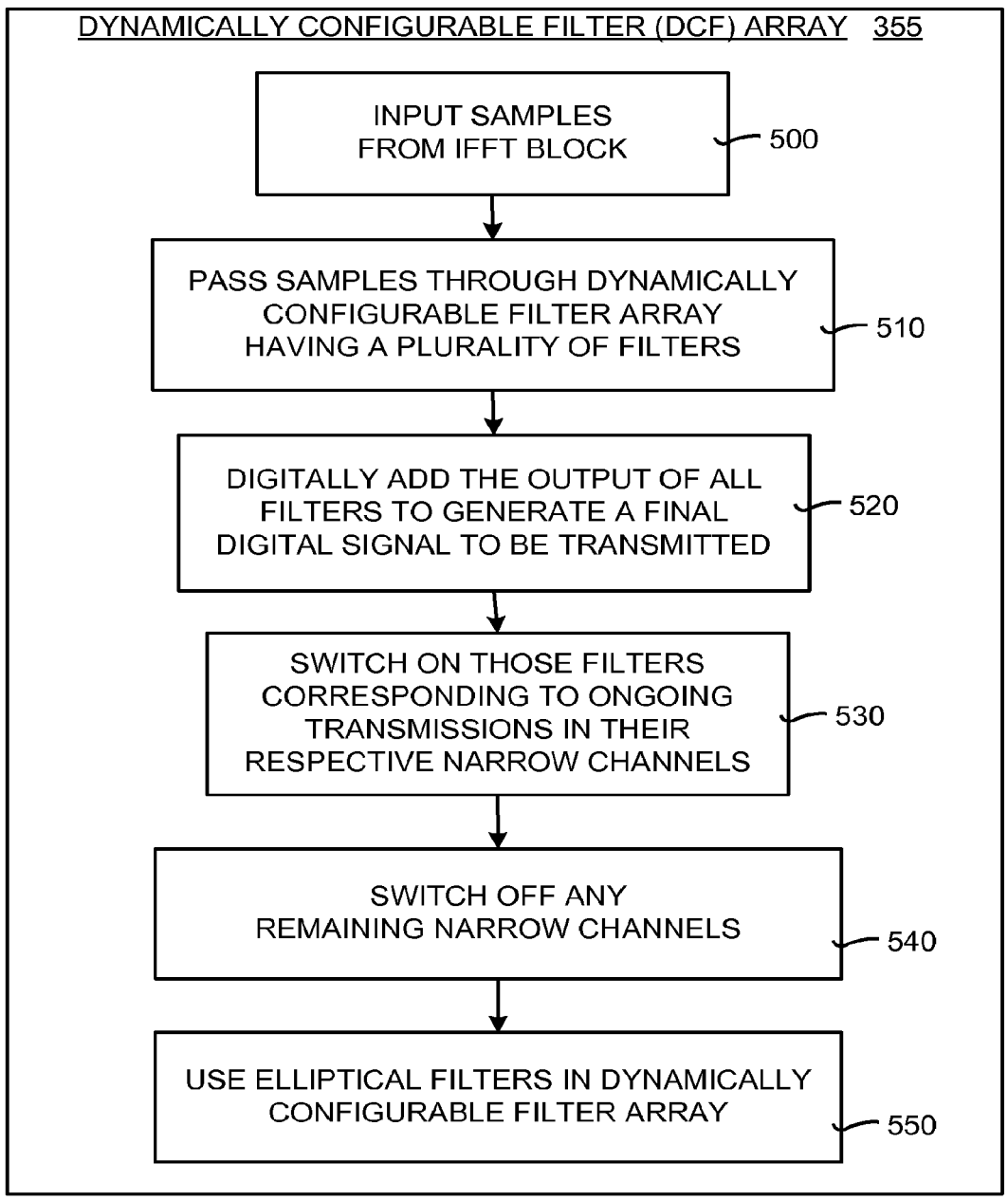
FIG. 5 is a flow diagram illustrating the operational details of embodiments of the dynamically configurable filter (DCF) array shown in FIG. 3.

FIG. 5 is a flow diagram illustrating the operational details of embodiments of the dynamically configurable filter (DCF) array 355 shown in FIG. 3. As depicted in FIG. 5, the DCF array 355 inputs samples from the IFFT block (box 500). Next, the samples are passed through the DCF array 355 having a plurality of filters (box 510). In some embodiments, the DCF array 355 includes n filters, one corresponding to each narrow channel of the transmitter. Since more than one channel could be transmitting at any given time, the outputs of all the filters are added digitally by the adder 360 to generate the final digital signal to be transmitted (box 520).

Note that this the DCF array 355 should be dynamically configurable, so that only those filters that correspond to ongoing transmissions in their respective narrow channels (box 530). The remainder of the narrow channels is switched off (box 540). This is because if the filter of a neighboring channel is on while the corresponding radiolet is not transmitting, then spillage from the current filter may result in failure of carrier sense in the adjacent channel. However, when the neighboring channel is also transmitting, it is allowable for both filters to be on. This is because the spillage from the current channel will be at the spectral nulls of the adjacent channel since the IRSS module 330 synchronizes the radiolets. The filter switching logic 350 is responsible for dynamically configuring the DCF array 355.

In some embodiments of the DCF array 355, elliptic filters are used to limit spectral spillage of each radiolet (box 550). It has been found that elliptic filters are efficient in terms of processing needs for a given guard band size.

II.B. Compound Receiver

As shown in FIG. 1, embodiments of the multiple independent narrow-channel wireless system 100 and method also include the compound receiver 120. Once again, a simple design would be to duplicate an OFDM receiver n times. This would require the use of a filter array in front so that each of the duplicated receivers receives traffic for only their narrow channel. However, this simple design will fail when there is simultaneous transmission and reception, since the self-interference caused by the local transmitter can overwhelm reception on adjacent narrow channels.

Before discussing the details of the compound receiver 120, an overview of a typical OFDM receiver will be given. Similar to the transmitter discussed above, a typical OFDM receiver can be logically divided into two distinct parts: a digital baseband and an analog front end. These two parts will now be discussed.

For an analog front end, the received signal from the antenna is passed on to a receive filter to prohibit interference from adjacent channels. The filtered signal is down-converted from carrier frequency (2.4 GHz) to a baseband signal with frequencies (0 to B MHz). An analog to digital converter (ADC) digitizes the baseband signal and passes on the samples to the digital baseband circuit.

For the digital baseband, the digitized signal samples are grouped into OFDM frames. OFDM frames are the presented as input to a Fast Fourier Transform (FFT) block one at a time. The FFT block takes as input an OFDM frame and outputs symbols. These symbols are then mapped into binary data using the symbol to bits map.

While the OFDM transmitter and receiver are similar in many ways, four key challenges make the receiver design significantly more complex than that of the transmitter. Specifically, the need for automatic gain control (AGC) to scale received signals from a given transmitter to the receiver's operating range, frame synchronization using preambles to detect the start of a frame, frequency offset estimation to match transmitter and receiver frequencies, and carrier phase offset and gain correction using pilot symbols to account for changes to the wireless channel.

The compound receiver 120 of embodiments of the multiple independent narrow-channel wireless system 100 and method improve upon this simple design by using analog interference cancellation to mitigate the impact of self-interference. In addition, an array of OFDM receivers is used. Given that different transmitters, who are not time and frequency synchronized, can transmit on adjacent narrow channels to the same receiver, this receiver array is used to independently process these transmissions.

Embodiments of the multiple independent narrow-channel wireless system 100 and method optimize the processing requirements of each of the receivers by leveraging the fact that the bandwidth of each radiolet is 1/n the total bandwidth. Thus, the compound receiver 120 uses fractional data rate processing, as discussed in detail below. Fractional data rate processing reduces the processing needs of each receiver by a factor of n.

Figure 6:
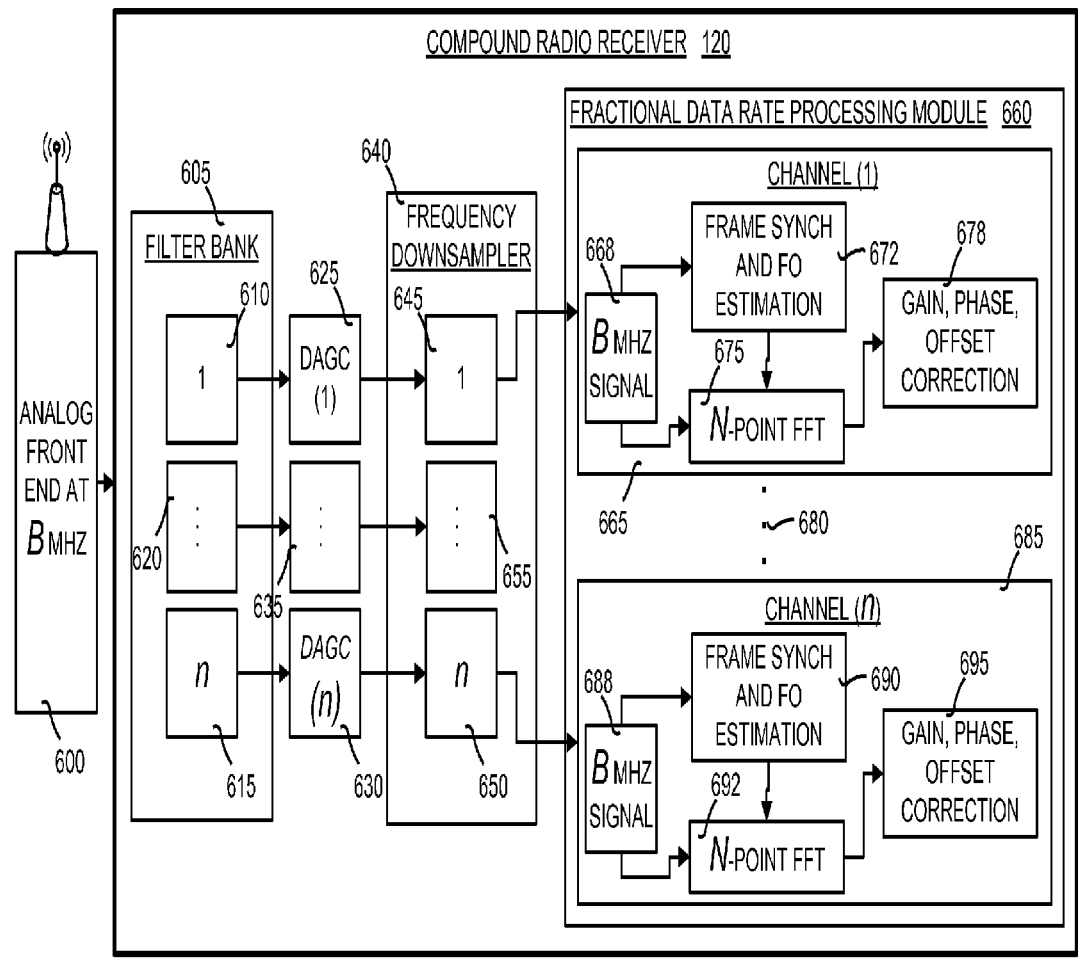
FIG. 6 is a block diagram illustrating the operational details of embodiments of the compound receiver shown in FIG. 1.

FIG. 6 is a block diagram illustrating the operational details of embodiments of the compound receiver 120 shown in FIG. 1. The compound receiver 120 is able to receive independent packet transmissions simultaneously from up to n different transmitters. These transmissions may start at different times and the transmitting devices may have different carrier frequency offsets.

The wireless channel from each transmitter can be varying independently. Thus, embodiments of the multiple independent narrow-channel wireless system and method perform AGC, frame synchronization, frequency offset estimation, and carrier phase offset and gain correction independently for each narrow channel. This necessitates the need for a receiver array. The receiver array includes a receiverlet for each narrow channel. However, each receiverlet needs to only operate at fractional data rates. The fractional data rate processing is described in detail below.

As shown in FIG. 6, the compound receiver 120 receives a signal from various transmitters through the receiver analog front end 600. A filter bank 605 filters the incoming signal into its various narrow channels, such as channel (1) 610 to channel (n) 615. The ellipsis 620 indicates that there may be more than two narrow channels.

After filtering, the compound receiver 120 sends the channels to a delayed automatic gain control (DAGC). Each channel has its own DAGC, namely a DAGC (1) 625 (for channel (1)) to a DAGC (n) 630 (for channel (n)). Once again, the ellipsis 635 indicates that there may be more than two DAGC channels.

Each channel then is fed in to a frequency downsampler 640. In particular, the frequency downsampler 640 includes a frequency downsampler (1) 645 for channel (1) and a frequency downsampler (n) 650 for channel (n). The ellipsis 655 indicates that there may be more than two frequency downsampler channels.

The channels then are processed by a fractional data rate processing module 660. Each channel has its own fractional data rate processing. In particular, channel (1) is processed by fractional data rate processor (1) 665. A B MHz signal (1) 668 (meaning the signal from channel (1)) is input and then processed by a frame synchronization and first order (FO) estimation (1) 672 and an N-point FFT (1) 675. The final processing is the gain, phase, and offset correction (1) 678 done on the channel (1) signal. The ellipsis 680 means that there are fractional data rate processors for each channel.

Channel (n) is processed by fractional data rate processor (n) 685. A B MHz signal (n) 688 is input and then processed by a frame synchronization and first order estimation (n) 690 and an N-point FFT (n) 692. The final processing for channel (n) is the gain, phase, and offset correction (n) 695.

II.B.1. Fractional Data Rate Processing Module

Having a completely separate full-fledged OFDM receiver for each radiolet operating at B MHz requires n times the processing (operations per second) of a standard OFDM receiver. This can be extremely taxing on embodiments of the multiple independent narrow-channel wireless system and method. Fundamentally, however, the net bandwidth (and hence the data rate) of each radiolet is only 1/n of the overall data rate. This implies that, in principle, the processing requirements of each receiverlet be only 1/n of the wideband OFDM receiver. Thus, the overall processing requirements of the compound receiver of embodiments of the multiple independent narrow-channel wireless system and method is that it remain the same as that of the OFDM receiver.

Figure 7:
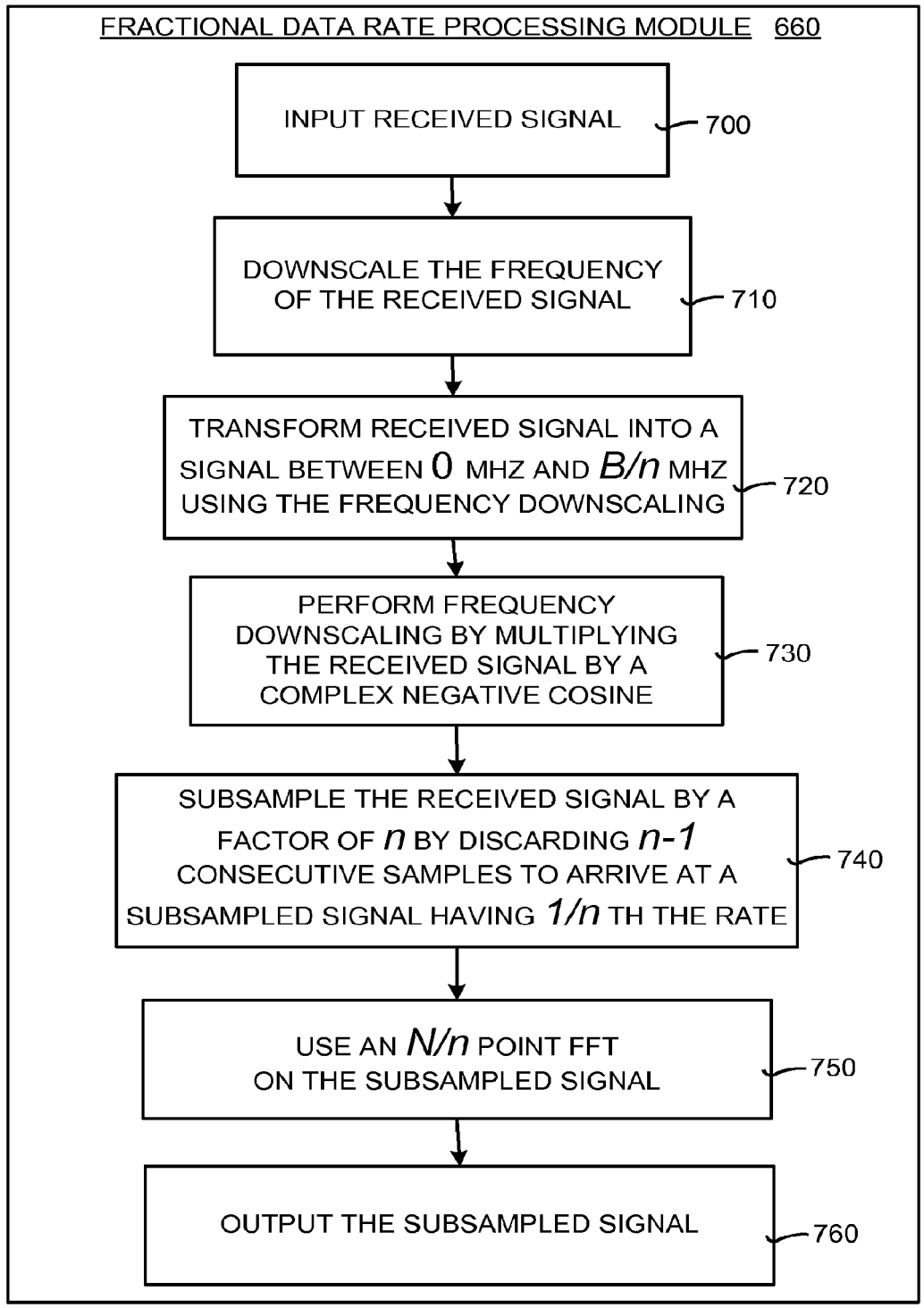
FIG. 7 is a flow diagram illustrating the operational details of embodiments of the fractional data rate processing module shown in FIG. 6.

FIG. 7 is a flow diagram illustrating the operational details of embodiments of the fractional data rate processing module 660 shown in FIG. 6. The operation of the module 660 begins by inputting the received signal (box 700). Next, the module 660 downscales the frequency of the received signal (box 710). The idea behind fractional data rate processing is that since the bandwidth of each radiolet is only B/n MHz, the signal can be transformed into a signal between 0 MHz to B/n MHz by frequency downscaling (box 720). This is exactly the opposite of frequency up-scaling done for generating preambles at the transmitter. In some embodiments of the module 660, this is achieved by multiplying received samples by a complex negative cosine (box 730).

Once down-scaled, the module 660 then subsamples the signal by a factor of n, by discarding n−1 consecutive samples to arrive at a digital signal with 1/n th the rate (box 740). After this point, the receiverlet remains exactly the same as an OFDM receiver except the use of an N/n point FFT instead of an N point FFT (box 750). The subsampled signal then is output from the module 660 (box 760).

II.B.2. Analog Interference Cancellation

Self-interference cancellation is desirable to avoid self transmissions interfering from ongoing receptions. In order to enable this, embodiments of the multiple independent narrow-channel wireless system 100 and method use analogue self-interference cancellation. This is a technique in which the transmitter's output is subtracted from the receiver's input using an analog circuit.

Analog interference cancellation has been used in the context of enabling full duplex communication in the same channel. Embodiments of the multiple independent narrow-channel wireless system 100 and method, however, are significantly less stringent compared to full-duplex since it is desirable only to receive only in adjacent channels.

In some embodiments of the multiple independent narrow-channel wireless system 100 and method, a noise canceler is used. The signal from the transmit antenna (the self-interference) is fed back through a wire to the noise canceler, which is connected to the receive antenna. The noise canceler subtracts the self-interfering signal from the received signal and recovers the received signal.

II.C. Operation in White Spaces

Embodiments of the multiple independent narrow-channel wireless system 100 and method are able to operate in white spaces. Embodiments of the multiple independent narrow-channel wireless system 100 and method assume that the frequency usage of the primary transmitters is known. This is can be accomplished, for example, using the database made available through a federal communications commission (FCC) ruling. One challenge for embodiments of the multiple independent narrow-channel wireless system 100 and method is which frequency of operation to choose that will maximize its throughput.

Previous work has examined this problem and proposed a metric called MCham to determine both center frequency as well as bandwidth of operation for secondary devices. The MCham metric for a node k with a certain center frequency f and front-end bandwidth B is given by the equation:

$$MCham_k(f, B) = \frac{B}{5} \prod_{c \in (f,B)} \rho_k(c) \quad (1)$$

Here, C corresponds to the subchannels contained in (f, B), and $\rho_k(c)$ corresponds to the expected share of node k in a subchannel c, given by the equation:

$$\rho_k(c) = \max\left(R_k(c), \frac{1}{L_k^c}\right). \quad (2)$$

In equation (2), $R_k(c)$ refers to the fraction of residual airtime available in the channel c and $L_k^c$ refers to the total number of contenders in the channel.

One key constraint with the metric is that its radio only supports the notion of a single channel that operated in a contiguous manner over the full bandwidth. This creates two key disadvantages. First, the need to choose an operating bandwidth (such as 5 MHz) that may be lower than the full bandwidth of the radio (such as 20 MHz). Second, the MCham metric has to be conservative since a wideband radio cannot use the channel until all overlapping subchannels are free at the same time. This is one reason for the product term in Equation 1. It should also be noted that that this coupling could also result in starvation.

Because embodiments of the multiple independent narrow-channel wireless system 100 and method support independent narrow channels, both of the disadvantages described above disappear. Embodiments of the system 100 and method can always use its full available bandwidth since it can operate in a non-contiguous manner around any primary transmitters. Also, since the narrow channels are independent, the throughput available estimate need not be conservative and is simply the summation of throughput in each of its narrow channels.

Embodiments of the multiple independent narrow-channel wireless system and method use a new metric called the throughput maximal metric (or TMax) for determining its frequency of operation.

Figure 8:
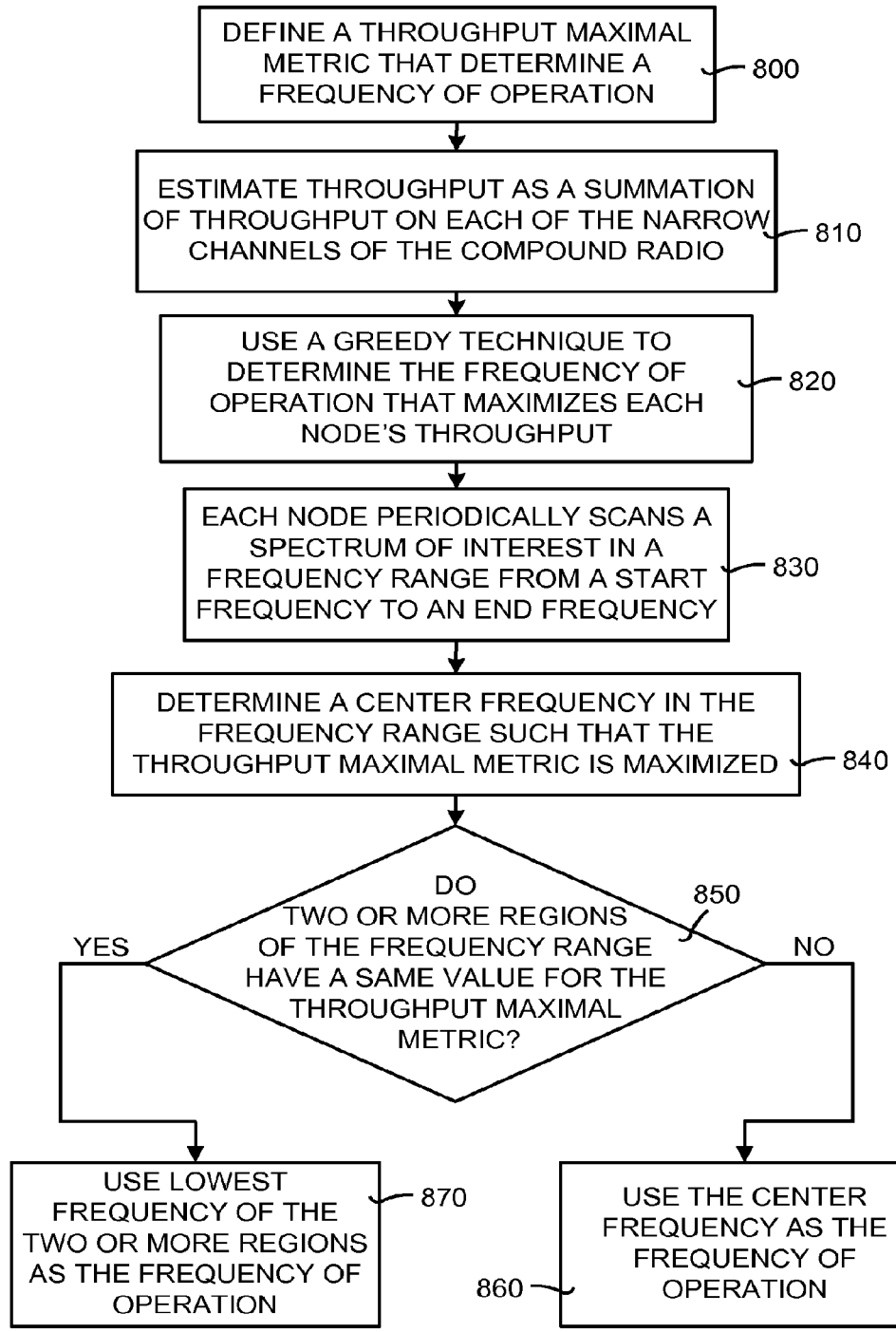
FIG. 8 is a flow diagram illustrating the operational details of embodiments of the throughput maximal metric technique used in embodiments of the multiple independent narrow-channel wireless system and method shown in FIG. 1.

FIG. 8 is a flow diagram illustrating the operational details of embodiments of the throughput maximal metric technique used in embodiments of the multiple independent narrow-channel wireless system 100 and method shown in FIG. 1. As shown in FIG. 8, the operation begins by defining a throughput maximal metric (TMax) that determines a frequency of operation of the compound receiver 120 (box 800).

Mathematically, TMax is given by the equation, $$TMax_k(f, B, n) = \sum_{c \in (f,B,n)} \frac{B}{n} \rho_k(c), \quad (3)$$

where n is number of narrow channels and $\rho_k(c)$ for each narrow channel C is estimated using Equation 2. The throughput is estimated as a summation of the throughput on each of the narrow channels of the compound radio (box 810).

Embodiments of the multiple independent narrow-channel wireless system 100 and method use the following greedy algorithm for determining its center frequency of operation that maximizes each node's throughput (box 820). Periodically, every node scans the spectrum of interest in a frequency range from a start frequency ($f_{start}$) to an end frequency ($f_{end}$) (box 830). The idea here is to determine the center frequency f in this frequency range, such that the metric TMax is maximized (box 840).

A determination then is made as to whether two or more regions of the frequency range have the same value for TMax (box 850). If not, then the center frequency is used as the frequency of operation (box 860). If so, then embodiments of the multiple independent narrow-channel wireless system 100 and method choose the lower frequency as the frequency of operation (box 870).

This greedy technique is optimal, which can be proved as follows. Since nodes are not synchronized, without lack of generality, assume that only one node performs the frequency selection operation at any given time. It can be shown that at every step of the distributed algorithm, embodiments of the multiple independent narrow-channel wireless system 100 and method are converging to the optimal aggregate network throughput since the use of the TMax metric to maximize individual node's throughput results in the aggregate throughput of the network to either increase (in case free spectrum or free airtime is available), or remain same (when spectrum is fully occupied and the channels are mostly busy). Thus, the network quickly stabilizes to the optimal frequency selection in relatively few steps.

When a primary or secondary node leaves the network, new empty spaces can get created. However, in the case of a tie in the value of TMax, the lowest f is chosen. This helps avoid fragmentation of spectrum during churn. Thus, contiguous chunks of free spectrum, if available, will be at the higher end of the spectrum at any given time. This can then be used by newly arriving nodes.

III. Exemplary Operating Environment

Figure 9:
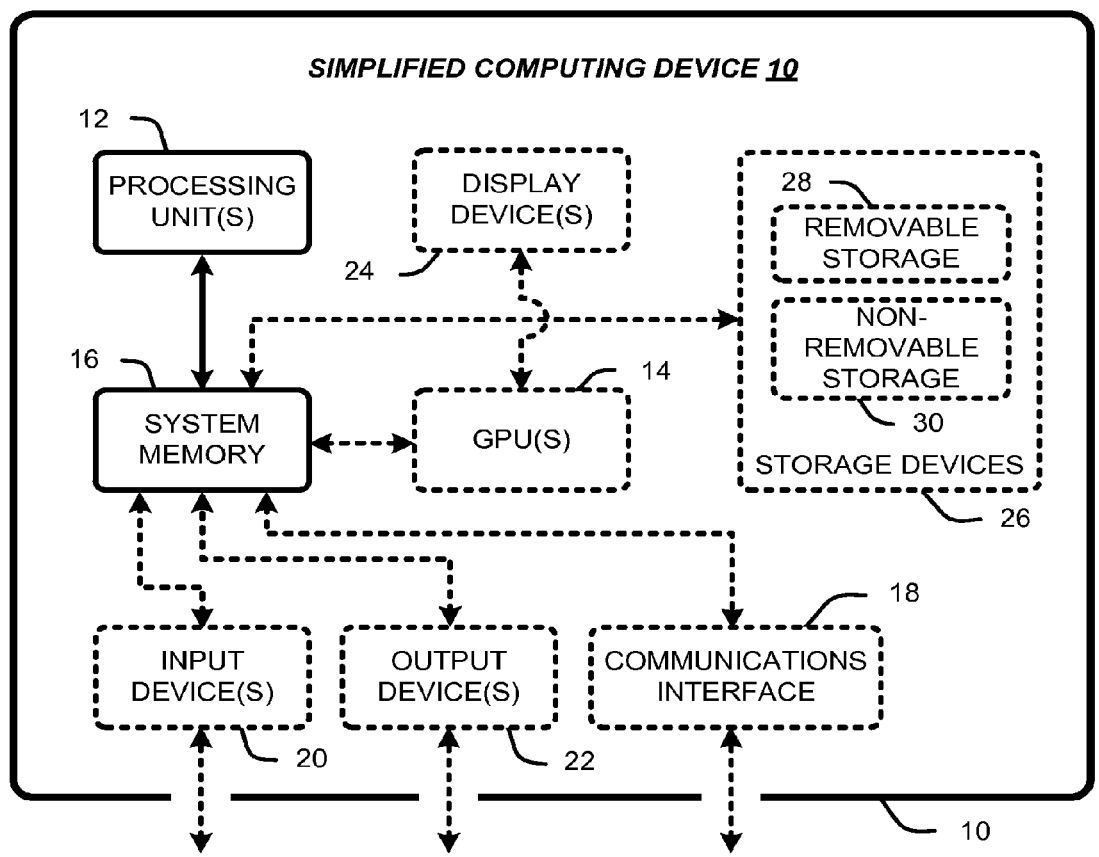
FIG. 9 illustrates a simplified example of a general-purpose computer system on which various embodiments and elements of the multiple independent narrow-channel wireless system and method, as described herein and shown in FIGS. 1-8, may be implemented.

Embodiments of the multiple independent narrow-channel wireless system 100 and method described herein are operational within numerous types of general purpose or special purpose computing system environments or configurations. FIG. 9 illustrates a simplified example of a general-purpose computer system on which various embodiments and elements of the multiple independent narrow-channel wireless system 100 and method, as described herein and shown in FIGS. 1-8, may be implemented. It should be noted that any boxes that are represented by broken or dashed lines in FIG. 9 represent alternate embodiments of the simplified computing device, and that any or all of these alternate embodiments, as described below, may be used in combination with other alternate embodiments that are described throughout this document.

For example, FIG. 9 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the multiple independent narrow-channel wireless system 100 and method described herein, the device should have a sufficient computational capability and system memory to enable basic computational operations. In particular, as illustrated by FIG. 9, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 9 may also include other components, such as, for example, a communications interface 18. The simplified computing device of FIG. 9 may also include one or more conventional computer input devices 20 (e.g., pointing devices, keyboards, audio input devices, video input devices, haptic input devices, devices for receiving wired or wireless data transmissions, etc.). The simplified computing device of FIG. 7 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 9 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the multiple independent narrow-channel wireless system 100 and method described herein, or portions thereof, may be stored, received, transmitted, or read from any desired combination of computer or machine readable media or storage devices and communication media in the form of computer executable instructions or other data structures.

Finally, embodiments of the multiple independent narrow-channel wireless system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
a transmitter; and
a receiver,
the receiver being configured to:
perform independent carrier sensing on multiple unsynchronized wireless channels of a wide wireless channel to identify multiple available unsynchronized wireless channels of the wide wireless channel;
the transmitter being configured to:
obtain multiple symbols for transmission on the multiple available unsynchronized wireless channels, the multiple symbols representing multiple different packets;
perform synchronization of the multiple symbols across the multiple available unsynchronized wireless channels by creating a composite frame comprising the multiple symbols;
process the composite frame comprising the multiple symbols representing the multiple different packets using a single transform operation to obtain a transmission signal; and
transmit the transmission signal on the multiple available unsynchronized wireless channels of the wide wireless channel,
the receiver being further configured to:
receive an incoming signal on multiple other unsynchronized wireless channels of the wide wireless channel and
perform separate fractional data rate processing of the incoming signal on the multiple other unsynchronized wireless channels of the wide wireless channel.

2. The computing device of claim 1, further comprising:
a processing unit; and
a memory device or storage device storing computer-executable instructions that, when executed by the processing unit, cause the processing unit to:
provide the multiple different packets to the transmitter, wherein the transmission signal represents bits from each of the multiple different packets.

3. The computing device of claim 2, wherein the transmitter is configured to include first bits from a first packet in a first available wireless channel of the wide wireless channel and second bits from a second packet in a second available wireless channel of the wide wireless channel.

4. The computing device of claim 3, wherein the transmitter is further configured to:
transmit the first bits of the first packet and the second bits of the second packet while the receiver is receiving other bits of at least two other packets on the multiple other unsynchronized wireless channels.

5. The computing device of claim 1, wherein the receiver is configured to perform automatic gain control independently for each of the multiple available unsynchronized wireless channels.

6. A computing device comprising:
a receiver;
a processing unit; and
a memory device or storage device storing computer-executable instructions,
the receiver being configured to:
receive an incoming signal that includes data from different packets transmitted by different transmitters on different narrow wireless channels of a wide wireless channel; and
perform separate fractional data rate processing on individual narrow wireless channels to extract the data from the different packets transmitted by the different transmitters, the fractional data rate processing including discarding consecutive samples of the incoming signal,
the computer-executable instructions, when executed by the processing unit, causing the processing unit to obtain the data from the receiver.

7. The computing device of claim 6, wherein the receiver is configured to perform automatic gain control separately for the individual narrow wireless channels.

8. The computing device of claim 6, wherein the receiver is further configured to:
convert the incoming signal into a digital baseband signal, the digital baseband signal including the data from the different packets transmitted by the different transmitters; and
downscale the digital baseband signal into corresponding narrow channel signals with narrower bandwidth than the digital baseband signal, wherein the separate fractional data rate processing is performed on a first narrow channel signal of the digital baseband signal to extract first data from a first packet transmitted by a first transmitter and a second narrow channel signal of the digital baseband signal to extract second data from a second packet transmitted by a second transmitter.

9. The computing device of claim 8, wherein the bandwidth of each narrow channel signal is B/n, where B is the bandwidth of the digital baseband signal and n is the number of narrow wireless channels in the wide wireless channel.

10. The computing device of claim 8, wherein the receiver is configured to discard second samples from the second narrow channel signal when performing fractional data rate processing on the first narrow channel signal, and discard first samples from the first narrow channel signal when performing fractional data rate processing on the second narrow channel signal.

11. The computing device of claim 6, wherein the wide wireless channel is 20 megahertz, 40 megahertz, or 80 megahertz wide.

12. The computing device of claim 11, wherein the wide wireless channel includes a blocked out channel and the different narrow wireless channels do not include the blocked out channel.

13. A computing device comprising:
a transmitter; and
a receiver;
the receiver being configured to perform independent carrier sensing on multiple unsynchronized wireless channels of a wide wireless channel to identify multiple available unsynchronized wireless channels of the wide wireless channel;
the transmitter being configured to:
obtain multiple symbols for transmission, the multiple symbols representing multiple different packets;
perform synchronization of the multiple symbols across the multiple available unsynchronized wireless channels by creating a composite frame comprising the multiple symbols representing the multiple different packets;

process the composite frame comprising the multiple symbols representing the multiple different packets using a single transform operation to obtain an outgoing signal representing the multiple symbols; and transmit the outgoing signal.

14. The computing device of claim 13, wherein the multiple available unsynchronized wireless channels include non-contiguous frequencies.

15. The computing device of claim 13, wherein the multiple different packets are destined for at least two different receivers.

16. The computing device of claim 15, wherein the single transform operation is an N-point inverse fast Fourier transform, where N is the number of subbands in the wide wireless channel.

17. The computing device of claim 16, wherein the outgoing signal, as obtained by processing the composite frame using the single transform operation, is obtained from a digital baseband signal with a bandwidth B.

18. The computing device of claim 17, wherein the transmitter comprises a clock configured to run at a rate of N/B for the synchronization.

19. The computing device of claim 17, wherein the transmitter comprises an analog front-end configured to convert the digital baseband signal into the outgoing signal at a carrier frequency.

20. The computing device of claim 13, wherein the receiver is further configured to:

receive an incoming signal on other unsynchronized wireless channels of the wide wireless channel; and perform separate data processing of the incoming signal on each of the other unsynchronized wireless channels to extract other data from at least two different transmitters.

* * * * *